`US 7,955,431 B2`

United States Patent
Bousseau et al.

(10) Patent No.: US 7,955,431 B2
(45) Date of Patent: Jun. 7, 2011

(54) USE OF AN ORGANIC SOL OF CERIUM IN PAINTS, PARTICULARLY LACQUERS AND VARNISHES

(75) Inventors: Jean-Noel Bousseau, Paris (FR); Bruno Echalier, Paris (FR); David Fauchadour, Paris (FR)

(73) Assignee: Rhodia Operations, Aubervilliers (FR)

( * ) Notice: Subject to any disclaimer, the term of this patent is extended or adjusted under 35 U.S.C. 154(b) by 0 days.

(21) Appl. No.: 10/505,839

(22) PCT Filed: Feb. 26, 2003

(86) PCT No.: PCT/FR03/00624
§ 371 (c)(1),
(2), (4) Date: Mar. 31, 2005

(87) PCT Pub. No.: WO03/072663
PCT Pub. Date: Sep. 4, 2003

(65) Prior Publication Data
US 2005/0182171 A1   Aug. 18, 2005

(30) Foreign Application Priority Data
Feb. 27, 2002  (FR) ..................................... 02 02470

(51) Int. Cl.
C08K 5/00 (2006.01)
C08K 3/00 (2006.01)
C08K 3/10 (2006.01)
C08K 3/18 (2006.01)
B01F 3/08 (2006.01)
C09K 3/00 (2006.01)
C08G 18/28 (2006.01)
C08L 75/00 (2006.01)

(52) U.S. Cl. .......... 106/499; 516/33; 523/513; 524/284; 524/403; 524/430; 524/590

(58) Field of Classification Search ................ 106/499, 106/401; 524/403, 284, 430, 590; 542/403; 516/33; 523/513
See application file for complete search history.

(56) References Cited

U.S. PATENT DOCUMENTS

| | | | | |
|---|---|---|---|---|
| 4,578,415 A | * | 3/1986 | Learner | 524/322 |
| 4,886,624 A | | 12/1989 | Gradeff et al. | |
| 5,324,346 A | * | 6/1994 | Morgan et al. | 106/14.05 |
| 5,376,304 A | * | 12/1994 | Yamamoto et al. | 516/33 |
| 5,721,294 A | * | 2/1998 | Buter et al. | 523/201 |
| 6,093,240 A | * | 7/2000 | Matsumura et al. | 106/287.11 |
| 6,210,451 B1 | * | 4/2001 | Chopin et al. | 44/357 |
| 6,214,416 B1 | * | 4/2001 | Sakagami et al. | 427/387 |
| 6,271,269 B1 | * | 8/2001 | Chane-Ching et al. | 516/33 |
| 6,379,776 B1 | * | 4/2002 | Tada et al. | 428/149 |
| 6,521,677 B2 | | 2/2003 | Yashiro et al. | |
| 6,544,647 B1 | * | 4/2003 | Hayashi et al. | 428/403 |
| 6,649,156 B1 | * | 11/2003 | Chane-Ching | 424/70.9 |
| 6,824,867 B2 | * | 11/2004 | Hayashi et al. | 428/847.1 |
| 6,869,584 B2 | * | 3/2005 | Ying et al. | 423/600 |

FOREIGN PATENT DOCUMENTS

| | | |
|---|---|---|
| DE | 19907703 A1 | 8/2000 |
| EP | 0671205 A2 | 9/1995 |
| EP | 0732356 A2 | 9/1996 |
| JP | 7-286116 | 10/1995 |
| JP | 10-102002 | 4/1998 |
| WO | WO 01/10545 | 2/2001 |

OTHER PUBLICATIONS

International Search Report dated Aug. 25, 2003 for International Application No. PCT/FR03/00624.
Brown, Roger F G, Additives in Coatings—A Necessary Evil?, Exhibit A, Additives in Water-borne Coatings, Pigment Dispersion Group, Technology Centre Decorative Coatings, pp. 1-6.
Paint, Wikipedia, http://ep.wikipedia.org/wiki/Paint, May 15, 2009, pp. 1-8.
Antéor Satin, Seigneurle, PPO AC—France, Jan. 2009, pp. 1-2.
Ciba Tinuvin 1130, Ciba Specialty Chemicals, Coating Effects Segment, pp. 1-4.
Boyle, Maureen A. et al., Compendium, "Composites." ASM Handbook/extraction, Epoxy Resins, Prof. H. Hansmann, FB MVU, Werkstofftechnologien/Kunststofftechnik, Oct. 2003.
A "How-to" Guide for the Use of ACTIV-8, R.T. Vanderbilt Company, Inc., Industrial Minerals and Chemicals.

* cited by examiner

*Primary Examiner* — Anthony J Green
*Assistant Examiner* — Pegah Parvini
(74) *Attorney, Agent, or Firm* — Buchanan Ingersoll & Rooney, P.C.

(57) ABSTRACT

The invention relates to the use of an organic cerium sol in paints, in particular finishes or varnishes, to improve durability. More particularly, the sol used can be a sol comprising an amphiphilic acid system, an organic phase and particles in the form of agglomerates of crystallites with a $d_{80}$, advantageously $d_{90}$, of at most 5 nanometers, 90% (by weight) of agglomerates comprising 1 to 5, preferably 1 to 3 crystallites. The paints incorporating a cerium sol have improved water resistance properties and mechanical properties.

10 Claims, No Drawings

USE OF AN ORGANIC SOL OF CERIUM IN PAINTS, PARTICULARLY LACQUERS AND VARNISHES

This application is an application under 35 U.S.C. Section 371 of International Application Number PCT/FR03/00624 filed on Feb. 23, 2003.

The present invention relates to the use of an organic cerium sol in paints, in particular in finishes or varnishes.

Many substances are routinely used in the furniture, carpentry, flooring and construction industries to protect wood from degradation due to light and bad weather. UV radiation combined with water and oxygen is known to rapidly decolorize it. Further, when wood is used outdoors in particular, also has to be protected against the development of algae, fungi and a variety of micro-organisms.

Paints, in particular finishes and varnishes, are routinely used to protect the wood.

However, known finishes and varnishes, which have complex formulae based on organic products such as isocyanate complexes, for example, mineral products such as iron oxides, or protective additives such as UV absorbers (benzotriazole, for example) do not exhibit entirely satisfactory durability or protection against UV radiation. Organic UV absorbers can degrade with time; they may migrate to the surface or be leached out by bad weather. Known mineral UV absorbers such as titanium dioxides have to be used in concentrations that are sufficiently high to be effective as regards UV, but increasing the concentration is detrimental to transparency, water resistance or the mechanical properties of the varnish or finish. Further, UV-curing formulations are being used in increasing numbers. However, organic UV absorbers can block the curing of the formulations during application to the wood.

Thus, there is a need for paints and finishes or varnishes with greater durability. This need exists not only in the wood industries mentioned above, but also in other fields such as cosmetics, ink protection, photosensitive pigments or more generally, any volume located behind a surface that has to be protected from the deleterious effects of UV, water and oxygen or one of these elements.

Thus, the aim of the invention is to improve said durability.

To this end, the invention resides in the use of an organic cerium sol in a paint type composition, in particular a finish or varnish, as an additive that improves the durability of the composition.

Compositions incorporating said sol have improved water resistance and mechanical properties, which thus increases their service life or the period over which they are present on the substrate they are protecting. Their aging properties may also be improved.

Further, the use of a solution according to the invention can retain said advantages even in UV-curable compositions.

Further characteristics, details and advantages of the invention will become more apparent from the following description, including various non limiting examples which are intended to illustrate it.

In the present description, the term "paint" is used to designate a coating of a polymeric nature deposited on a substrate, more precisely organic paints per se, varnishes and finishes. The term "finish" and "varnish" have the usual meanings in the technical field under consideration. A finish is generally a transparent or semi-transparent composition applied to the wood to protect it, with a dry matter content that can be of the order of 10% by weight or of the order of 40% to 50% by weight depending on whether it is a primer or topcoat. A varnish is a formulation or composition that is more concentrated than a finish.

The following paints based on the following resins are compositions that are concerned in the present invention: alkyd resins the most commonly used of which is termed glycerophthalic; resins modified with short or long oil; acrylic resins derived from esters of acrylic acid (methyl or ethyl) and methacrylic acid, optionally copolymerized with ethyl acrylate, 2-ethylhexyl acrylate or butyl acrylate; vinyl resins such as polyvinyl acetate, polyvinyl chloride, polyvinylbutyral, polyvinylformal, and vinyl chloride-vinyl acetate/vinylidene chloride copolymers; aminoplast or phenolic resins, usually modified; polyester resins, polyurethane resins; epoxy resins; silicone resins; cellulose resins or nitrocellulose resins.

The invention concerns paints, in particular varnishes or finishes, as used on a wood substrate in the wood industry but also on other substrates, for example in the cosmetics industry or in the automobile industry.

The expression "cerium sol" or "colloidal dispersion of cerium" designates any system constituted by fine solid particles of a cerium compound, with colloidal dimensions, in suspension in a liquid phase, said particles optionally also containing residual quantities of bound or adsorbed ions such as acetate ions or ammonium ions. The term "colloidal dimensions" means dimensions in the range about 1 nm to about 500 nm. It should be noted that in such a dispersion, the cerium can be either totally in the colloidal form or simultaneously in the form of ions and in the form of colloids.

The cerium is generally present in the sol in the form of an oxide and/or hydrated oxide (hydroxide) of cerium, the cerium principally being in the form of cerium IV. As an example, the amount of cerium III with respect to cerium IV (amount expressed as the atomic ratio of Ce III/total Ce) is preferably at most 5%, particularly at most 1%, and more particularly at most 0.5%.

The particles of cerium sol preferably have a size of at most 200 µm, more particularly at most 100 nm.

Here and throughout the description, the granulometry was determined by transmission electron microscopy (TEM) in conventional manner, using a sample that has been dried on a membrane of carbon supported on a copper grid.

The cerium dispersion or sol used in the present invention is an organic sol or dispersion. This means that the liquid phase is an organic phase.

Examples of organic phases that can be cited are aliphatic hydrocarbons such as hexane, heptane, octane, nonane, inert cycloaliphatic hydrocarbons such as cyclohexane, cyclopentane, cycloheptane, aromatic hydrocarbons such as benzene, toluene, ethylbenzene, xylenes, liquid naphthenes. Oil cuts of the Isopar or Solvesso type (trade marks of EXXON), in particular Solvesso 100 which essentially consists of a mixture of methylethyl- and trimethyl-benzene, Solvesso 150 which comprises a mixture of alkylbenzenes, in particular dimethylbenzene and tetramethylbenzene, and Isopar which essentially contains C11 and C12 iso-and cyclo-paraffinic hydrocarbons, are also suitable.

It is also possible to use, for the organic phase, chlorinated hydrocarbons such as chloro- or dichloro-benzene, or chlorotoluene. Ethers and aliphatic and cycloaliphatic ketones such as diisopropyl ether, dibutyl ether, methylethylketone, methylisobutylketone, diisobutylketone, mesityl oxide, can also be used.

Esters can be envisaged, but they suffer from the risk of becoming hydrolyzed. Esters which can be used which can be cited are those derived from the reaction of acids with C1 to C8 alcohols and in particular palmitates of secondary alcohols, such as isopropanol. An example which can be mentioned is butyl acetate.

Clearly, the organic phase can be based on a mixture of two or more hydrocarbons or compounds of the type described above.

Highly suitable cerium sols for use in the present invention that can be mentioned are those of the type described in European patent EP-A-0 671 205; reference to which should be made in this regard. Said sols can be present in two implementations.

In the first implementation, the cerium sol comprises an amphiphilic acid system and an organic phase in addition to cerium particles.

The organic phase is of the same type as that described above.

The amphiphilic system is constituted by an amphiphilic acid or a mixture of amphiphilic acids. The total carbon number (the mean if the system used is a mixture of acids) of the acids is advantageously over 6, preferably over 10, and desirably less than about 60.

Said acids can be linear or branched. They can be aryl, aliphatic or arylaliphatic acids, which may carry other functions provided that said functions remain stable in the media in which the dispersions of the present invention are to be used. Examples that can be used are aliphatic carboxylic acids, aliphatic sulphonic acids, aliphatic phosphonic acids, alkylaryl sulphonic acids and alkylaryl phosphonic acids containing about 10 to about 40 carbon atoms, whether they are natural or synthetic.

It is also possible to use carboxylic acids the carbon-containing chain of which carries ketone functions, such as pyruvic acids which are substituted alpha to the ketone function. They can also be alpha-halogeno carboxylic acids or alpha-hydroxy carboxylic acids. The chain attached to the carboxylic group may carry unsaturated bonds. However, in general, a superfluity of double bonds should be avoided as cerium catalyzes curing of double bonds. The chain may be interrupted by ether or ester functions provided that it does not substantially alter the lipophilic nature of the chain carrying the carboxylic group.

Examples which can be cited are fatty acids of tall oil, soya oil, tallow, or linseed oil, also oleic acid, linoleic acid, stearic acid and its isomers, pelargonic acid, capric acid, lauric acid, myristic acid, dodecylbenzenesulphonic acid, 2-ethylhexanoic acid, naphthenic acid, hexoic acid, toluenesulphonic acid, toluenephosphonic acid, laurylsulphonic acid, laurylphosphonic acid, palmitylsulphonic acid and palmitylphosphonic acid.

The quantity of amphiphilic acid used, expressed as the number of moles of acid per mole of ceric oxide, can vary widely, for example between 1/10 and 1 mole per mole of ceric oxide. The upper limit is not critical, but it is not necessary to use too much acid. Preferably, the amphiphilic acid is used in an amount of 1/5 to 4/5 mole per mole of ceric oxide. This mole ratio is calculated by taking as the moles of amphiphilic acid the number of moles multiplied by the number n of useful acid functions. More precisely, the number of acid equivalents represents the number of molecules of acid when the acid used is monofunctional, and must be doubled or trebled for dibasic and tribasic acids; more generally, it must be multiplied by the number of acid functions in the case of a polybasic acid.

In the organic phase, the proportion between the organic phase and the amphiphilic acid or acids is not critical. The weight ratio between the organic phase and the amphiphilic acid or acids is preferably selected to be between 0.3 and 2.0.

The principal characteristic of the sol in the first implementation resides in the constitution of its particles. Its particles are in the form of agglomerates of crystallites, in which crystallites the $d_{80}$, advantageously $d_{80}$, is at most 5 nanometers, 90% (by weight) of the agglomerates comprising 1 to 5, preferably 1 to 3 crystallites.

In the present description, the granulometry characteristics make reference to notations of the type $d_n$ in which n is a number from 1 to 99. This notation represents the size of objects for which n % in number of said objects have a size that is less than or equal to said size. As an example, a $d_{80}$ of 5 nanometers means that 80% by number of the objects is 5 nanometers or less in size.

The state of agglomeration of the particles is determined by examining the dispersion under TEM (high resolution transmission electron microscopy) or using a cryo-TEM technique. This technique means that samples that are kept frozen in their natural medium can be observed, the medium being either water or organic diluents such as aromatic or aliphatic solvents, such as Solvesso or Isopar or certain alcohols such as ethanol.

Thin films about 50 to 100 nm thick are frozen either in liquid ethane for aqueous samples, or in liquid nitrogen for other samples.

In a second implementation, the sol also contains, in addition to cerium particles, an amphiphilic acid system and an organic phase as is the case for the first implementation. However, this sol is characterized by a more specific amphiphilic acid system. Said system comprises at least one acid containing 11 to 50 carbon atoms, having at least one alpha, beta, gamma or delta branch of the atom carrying the hydrogen acid.

The preferred domain is 15 to 25 carbon atoms for the acids of said amphiphilic system. To obtain the best results, especially when the chain is short (less than 14 carbon atoms), when there is only one branch and especially when it is located gamma or delta to the atom carrying the acid hydrogen, it is highly desirable for the branch to be at least two carbon atoms long, advantageously three.

Preferably, the longest linear portion is at least 6, preferably 8 carbon atoms long.

Advantageously, the pKa of at least one of the acids is at most 5, preferably 4.5.

Advantageously again, the side chain(s) of branched acids contain at least two atoms, preferably three carbon atoms.

Particularly advantageous acids that can be cited are the constituent acids of the mixture of acids known as isostearic acid.

The description relating to the organic phase for the first implementation is also applicable here. The particle size characteristics can be less specific or different from those given for the first implementation. Thus the $d_{80}$, advantageously the $d_{90}$ of the particles constituted by crystallite agglomerates can be at most 10 nanometers and more particularly at most 8 nanometers. The crystallites which constitute the agglomerates and thus the particles are at most 5 nanometers in size. However, the sol of the second implementation can optionally also have the constitution and particle size characteristics mentioned above for the first implementation.

For the two implementations under consideration and in a further variation, 80% (by weight) of the agglomerates comprise 3 to 4 crystallites.

The water content of the sols is preferably at most 1%, more particularly at most 0.1% and still more preferably at most 100 ppm.

The sols of the two implementations described above can be prepared using the process disclosed in EP-A-0 671 205, reference to which should be made in this regard. This process essentially consists of hydrolyzing an aqueous phase containing cerium, generally an aqueous solution of cerium IV salts, to precipitate ceric oxide. Hydrolysis is carried out by heating the aqueous phase to a temperature which can be at least 80° C. In a second stage or simultaneously therewith, the suspension of cerium oxide obtained is brought into contact with an organic phase comprising said amphiphilic system.

It is also possible in a third implementation to use a cerium sol of the type described in International patent application WO-A-01/10545 reference to the disclosure of which should be made in this regard.

More precisely, the sol in said third implementation is of the type comprising cerium particles, an amphiphilic acid system and an organic phase, and it is characterized in that at least 90% of the particles are monocrystalline. The term "monocrystalline" means particles which are discrete and constituted by a single crystallite when the dispersion is examined under TEM as described above. Further, the particles can have a fine, narrow granulometry. They may have a $d_{50}$ in the range 1 to 5 nm, preferably in the range 2 to 3 μm. Regarding the amphiphilic acid and the organic phase, the foregoing description regarding the two preceding implementations is also applicable here.

The cerium sol is used in the paint, finish or varnish simply by mixing the sol with said paint, finish or varnish. The quantity of sol used is a function of the final desired amount of cerium oxide in the paint composition. This amount can be of any magnitude. It should be noted that it is possible to operate with high cerium contents without damaging the water resistance or the mechanical properties of the paint, finish or varnish. In general, a sol is used in a quantity such that the cerium oxide content is at most 25% by weight, preferably at most 10% by weight and more preferably at most 3% by weight with respect to the total composition. This quantity is sufficient to provide at the same time a paint, finish or varnish which ensures effective protection of the substrate, especially wood, against UV radiation with increased durability.

It is also possible to dry a sol of the type described above, for example by evaporation, to obtain a product in the form of a powder or gel. That product can then be taken up in dispersion in an organic phase of the type described above to once more obtain a sol which can be incorporated into the paint, finish or varnish in the manner described above.

The invention is applicable to any type of organic paint or paint in a solvent phase, in particular type of finish or varnish used on any substrate. Said substrate can in particular be formed from wood or metals, and in the latter case, for example, the invention is applicable to paints for automobiles. The substrate can also be a glass, the type of glass used in buildings, or glass intended to contain photosensitive products or materials. Other possible substrates are protective coatings for organic or mineral packaging, in particular when transparency in the visible region is to be retained.

The invention is also applicable to varnishes used in cosmetics. Further, the invention is advantageously applicable to compositions, in particular finishes, which are UV curable, i.e., finishes which, immediately after being deposited on a substrate, in particular on wood, undergo a treatment with ultraviolet radiation to dry them.

Finally, it should be noted that the compositions of the paints, finishes and varnishes obtained by implementation of the invention satisfy ecological requirements because cerium oxide is non-toxic.

Examples will now be given.

In the examples, the following tests were carried out.

Colorimetry

Measurement Conditions:

The colorimetric measurements were carried out in accordance with International Standard ISO 7724 using a MINOLTA CM 3610D spectrocolorimeter.

The measurement conditions were as follows:
specular included (all of the retrodiffused intensity was measured);
ultraviolet radiation was 100% filtered;
the results were expressed as the illuminant/observer C/10° couple.

The measurements were carried out on contrast cards, the paint being applied to a thickness of 150 microns (wet paint). To measure transparency, the measurements were made on the black background of the contrast cards.

Water Resistance

Measurement Conditions:

The water resistance was evaluated by measuring the contact angle between a droplet of water and the finish using a RAME & HART goniometer. The higher the droplet angle, the more hydrophobic is the finish and thus the less sensitive to water. The finishes were applied to a contrast card; the finishes were applied using a film printer to a thickness of 150 microns.

Ageing

Two ageing tests were employed.

The first test was of the QUVA type. It was carried out under the following conditions:
irradiation: UVA lamp with peak centred on 340 nm;
chamber temperature: 60° C.;
functional cycle: 4 hours irradiation in the dry phase at a temperature of 60° C. then 4 hours condensation in the dark at a temperature of 60° C.

Moisture was supplied by heating a tank of water located at the bottom of the apparatus (to produce water vapour) then said water condensed on the painted plates.

The second test was an accelerated ageing test termed the XENOTEST (ISO 4892) carried out under the following conditions:
irradiation: xenon arc lamp with suprax filters simulating sunlight but about one hundred times more intense. The radiative power was adjusted to 65 W/m$^2$;
chamber temperature: 30° C.;
functional cycle: 27 minutes irradiation in the dry phase at t=30° C. then 3 minutes irradiation in the wet phase at t=30° C.

The moisture was supplied by spraying liquid water directly onto the test plates using nozzles.

Mechanical Properties

The mechanical properties of the finishes were measured in two ways: The hardness of the film of finish was measured using the Persoz hardness test. This test was carried out in accordance with NFT 30-016 (paints and varnishes—a measurement of the hardness of a film of paint or varnish using the PERSOZ pendulum). This test was carried out on films of varnish applied onto glass plates at a thickness of 150 μm (wet paint) using a calibrated thickness applicator. The principal of characterization is to measure the damping time of a pendulum resting via two steel beads on the film to be studied. The hardness is expressed in seconds (time of one oscillation), corresponding to the number of oscillations of the pendulum when it is inclined at 12° with respect to the normal at the start and 4° corresponding to the end of the test.

A scratch resistance measurement was carried out using a BRAIVE sclerometer. The sclerometer was a stylus provided with a tungsten point on which a variable pressure is applied using a calibrated spring (the pressure is expressed in grams).

The scratch resistance is the maximum pressure (in grams) at which the tungsten point of the stylus leaves no trace. This test was carried out on films of varnish applied onto glass plates at a thickness of 150 μm (wet paint) using a calibrated thickness applicator.

In the examples below, the sol of the invention was a sol the particles of which were in the form of agglomerates of crystallites the $d_{80}$ of which was at most 8 nanometers, the particles comprising 2 to 5 crystallites. The organic phase of the sol was constituted by Isopar L and the amphiphilic acid was isostearic acid (Prisorine 3501 from Unichema International).

Throughout the examples, the comparative product based on an organic UV absorber was TINUVIN 1130 from Ciba and the comparative product based on a mineral UV absorber (titanium oxide) was Hombitec RM 400 from Sachtleben.

EXAMPLE 1

This example concerns use in a finish of a conventional long oil alkyd type formulation in white spirit, with 42% dry extract.

The sol of the invention was incorporated by simply mixing to an amount of 1.63% active material (cerium oxide) with respect to the total formulation. The comparative product (2) based on an organic UV absorber was incorporated in the same manner as before in an amount of 1% with respect to the total. The comparative product (3), based on a mineral UV absorber, was incorporated in the same manner as above, to an amount of 1.63% dry matter with respect to the total.

The formulations produced were applied to different supports and underwent conditioning in air under a controlled atmosphere (21° C.±2° C., 55%±5% relative humidity) for one week prior to evaluation.

TABLE 1

| Formulation | Description |
|---|---|
| 1, comparative | alkyd finish no UV absorber |
| 2, comparative | finish with 1% organic UV absorber |
| 3, comparative | finish with 1.63% mineral UV absorber |
| 4, invention | finish with 1.63% cerium sol (cerium oxide) |

The results of the colorimetric measurements are shown in Table 2 below.

TABLE 2

| | Black background | | |
|---|---|---|---|
| Formulation | L* | a* | b* |
| 1, comparative | 27.55 | 0.22 | 0.35 |
| 2, comparative | 27.7 | 0.24 | 0.26 |
| 3, comparative | 32.57 | 0.28 | −5.77 |
| 4, invention | 27.55 | 0.14 | 0.34 |

Table 2 shows that the tint of the finishes of the invention suffered practically no variation.

The results of the water resistance measurements are given in Table 3 below.

TABLE 3

| Formulation | Contact angle (°) |
|---|---|
| 1, comparative | 77 |
| 2, comparative | 76 |

TABLE 3-continued

| Formulation | Contact angle (°) |
|---|---|
| 3, comparative | 79 |
| 4, invention | 104 |

Note the improvement in water resistance properties; the finish of the invention exhibited pearling effect which rendered it hydrophobic.

Table 4 below summarizes the ageing results obtained from a QUVA type test. The finishes were applied to sea-pine boards using a brush to produce a GSM of 325 g/m².

TABLE 4

| Formulation | dE* at 25 exposure cycles | dE* at 135 exposure cycles |
|---|---|---|
| 1, comparative | 14 | 22 |
| 2, comparative | 11 | 20 |
| 4, invention | 9 | 14 |

The tint change (dE*) was recorded at two exposure times: 25 cycles and 135 cycles.

The times are expressed in 8 hour cycles.

The ageing properties of the paint were substantially improved with product 4.

EXAMPLE 2

This example concerns use in a finish of conventional industrial formulation, cellulose in type with commercial reference number SU4030 from ARCH COATINGS, France.

The sol of the invention was incorporated by simply mixing to an amount of 1.4% active material (cerium oxide) with respect to the total formulation. The comparative product (6) based on an organic UV absorber was incorporated in the same manner as before in an amount of 0.3% with respect to the total optimum dose at which the product had the necessary UV filtering effect sufficient for this type of product.

The formulations produced were applied to different supports and underwent conditioning in air for one week prior to evaluation.

TABLE 5

| Formulation | Description |
|---|---|
| 5, comparative | SU4030 finish, no UV absorber |
| 6, comparative | finish with 0.3% organic UV absorber |
| 7, invention | finish with 1.4% cerium sol (cerium oxide) |

The results of the water resistance measurements are given in Table 6 below.

TABLE 6

| Formulation | Contact angle (°) |
|---|---|
| 5, comparative | 90 |
| 6, comparative | 95 |
| 7, invention | 116 |

Note the improvement in water resistance properties; the finish of the invention exhibited a pearling effect which rendered it hydrophobic.

Table 7 below summarizes the ageing results obtained from a QUVA type test. The finishes were applied to boards of American cherry wood using a spray gun, in two layers (sanding was carried out between the two applications) to produce a GSM of 2×120 g/m².

TABLE 7

| Formulation | dE* at 10 exposure cycles | dE* at 35 exposure cycles |
|---|---|---|
| 5, comparative | 27 | 31 |
| 6, comparative | 14 | 26 |
| 7, invention | 14 | 23 |

The tint change (dE*) was recorded at two exposure times: 10 cycles and 35 cycles.

The times are expressed in 8 hour cycles.

The ageing properties of the paint were improved with product 7.

Table 8 below summarizes the mechanical properties results.

TABLE 8

| Formulation | PERSOZ hardness (seconds) | Scratch resistance (grams) |
|---|---|---|
| 5, comparative | 150 | 500 |
| 6, comparative | 175 | 450 |
| 7, invention | 260 | 600 |

The mechanical properties of the finish were substantially improved with product 7.

EXAMPLE 3

This example concerns use in a finish of conventional industrial polyurethane type formulation with commercial reference TU7425 catalyzed with a hardener with commercial reference TH790 from ARCH COATINGS, France.

The product of the invention (10) was incorporated by simply mixing to an amount of 1.3% active material (cerium oxide) with respect to the total formulation. The comparative product (9) based on an organic UV absorber was incorporated in the same manner as before in an amount of 0.3% with respect to the total, corresponding to the necessary and sufficient dose to provide an optimum UV filter effect for this type of product.

Catalyst TH790 was added to formulation TU7425 just before application, in an amount of 1 part catalyst to 10 parts of formulation TU7425.

The formulations produced were applied to different supports and underwent conditioning in air for one week prior to evaluation.

TABLE 9

| Formulation | Description |
|---|---|
| 8, comparative | finish TU7425, no UV absorber |
| 9, comparative | finish with 0.3% organic UV absorber |
| 10, invention | finish with 1.3% cerium sol (cerium oxide) |

The results of the colorimetric measurements are shown in Table 10 below.

TABLE 10

| Formulation | Black background | | |
|---|---|---|---|
| | L* | a* | b* |
| 8, comparative | 27.39 | 0.30 | 0.53 |
| 9, comparative | 27.30 | 0.21 | 0.30 |
| 10, invention | 27.30 | 0.17 | 0.53 |

Table 10 shows that the tint of the finishes of the invention suffered practically no variation.

The results of the water resistance measurements are given in Table 11 below.

TABLE 11

| Formulation | Contact angle (°) |
|---|---|
| 8, comparative | 73 |
| 9, comparative | 76 |
| 10, invention | 84 |

Note the improvement in water resistance properties for the finish of the invention.

Table 12 below summarizes the ageing results obtained using a XENOTYPE type test. The finishes were applied to boards of American cherry wood using a spray gun, in two layers (sanding was carried out between the two applications) to produce a GSM of 2×120 g/m$^2$.

TABLE 12

| Formulation | dE* after 234 hours exposure |
|---|---|
| 8, comparative | 13 |
| 9, comparative | 11 |
| 10, invention | 6 |

The tint change (dE*) was noted after 234 hours exposure.

The ageing properties of the paint were substantially improved with product 10. Table 13 below summarizes the mechanical properties results.

TABLE 13

| Formulation | PERSOZ hardness (seconds) | Scratch resistance (grams) |
|---|---|---|
| 8, comparative | 260 | 250 |
| 9, comparative | 290 | 250 |
| 10, invention | 300 | 350 |

The mechanical properties of the finish were substantially improved with product 10.

EXAMPLE 4

This example concerns use in a finish of conventional industrial formulation of the UV curable type with commercial reference HZ0294 from ARCH COATINGS, France.

The product of the invention (12) was incorporated by simply mixing to an amount of 2.25% active material (cerium oxide) with respect to the total formulation.

The formulations produced were applied to beech using a spray gun, in two layers (sanding was carried out between the two applications) to produce a GSM of 2×40 g/m$^2$. After a desolvation period of 10 minutes, each layer was cured by exposure under mercury UV lamps at a rate of 7 m/min in two passes. The energy received by the samples is shown in Table 14:

TABLE 14

| | Radiation | | | |
|---|---|---|---|---|
| | UVA | UVB | UVC | UVV |
| Power (W) | 213 | 139 | 25 | 138 |
| Energy (J) | 376 | 314 | 44 | 248 |

TABLE 15

| Formulation | Description |
|---|---|
| 11, comparative | HZ0294 finish, no UV absorber |
| 12, invention | Finish with 2.25% cerium sol (cerium oxide) |

Table 16 below summarizes the ageing results obtained from a QUVA type test. The finishes were applied to beech boards using a spray gun, in two layers (sanding was carried out between the two applications) to produce a GSM of 2×40 g/m$^2$.

TABLE 16

| Formulation | dE* at 10 exposure cycles | dE* at 35 exposure cycles |
|---|---|---|
| 11, comparative | 16 | 19 |
| 12, invention | 8 | 15 |

The tint change (dE*) was noted at two exposure times: 10 cycles and 35 cycles.

The times are expressed in 8 hour cycles.

The ageing properties of the paint were improved with product 12.

EXAMPLE 5

This example concerns use in a finish application and in a system with conventional industrial formulations of the UV curable type. This system comprised an impregnation finish with commercial reference HL0106 and a topcoat finish with commercial reference HL0121 from ARCH COATINGS, France.

The product of the invention (14) was incorporated by simply mixing to an amount of 1.7% active material (cerium oxide) with respect to the total formulation. The formulations produced were applied to beech using a spray gun, in two layers (sanding was carried out between the two applications) to produce a GSM of 2×40 g/m$^2$. After a desolvation period of 3 minutes, each layer was cured by exposure under gallium UV lamps at a rate of 7 m/min in one pass.

TABLE 17

| Formulation | Description |
|---|---|
| 13, comparative | Finishes HL0106 and HL0121, no UV absorber |
| 14, invention | Finish with 1.7% cerium sol (cerium oxide) |

The results of the colorimetric measurements are shown in Table 18 below.

TABLE 18

| Formulation | BEECH | | |
|---|---|---|---|
| | L* | a* | b* |
| 13, comparative | 68.61 | 10.08 | 25.60 |
| 14, invention | 68.90 | 9.60 | 25.76 |

Table 18 shows that the tint of the finishes of the invention suffered practically no variation.

The results of the water resistance measurements are given in Table 20 below. The finishes were applied to beech boards at a GSM of 2×40 g/m$^2$.

TABLE 19

| Formulation | Contact angle (°) |
|---|---|
| 13, comparative | 67 |
| 14 | 83 |

The water resistance properties were also evaluated by measuring the change in tint (dE*) of the finish after contact with water. The tests were evaluated calorimetrically before and after 50 minutes contact between the applied finish and a droplet of water. The higher the tint difference, the more hydrophilic the finish and thus the more sensitive it is to water. The finishes were applied to beech boards at a GSM of 2×40 g/m$^2$.

The results are given in Table 20 below.

TABLE 20

| Formulation | Tint difference after 50 minutes contact |
|---|---|
| 13, comparative | 1.8 |
| 14, invention | 0.9 |

Note the improvement in water resistance properties for the finish of the invention.

Table 21 below shows the results obtained from a XENOTEST type ageing test.

The finishes were applied to beech boards using a spray gun, in two layers (sanding was carried out between the two applications) to produce a GSM of 2×40 g/m$^2$.

TABLE 21

| Formulation | dE* after 40 hours exposure | dE* after 160 hours exposure |
|---|---|---|
| 13, comparative | 12 | 16 |
| 14, invention | 8 | 10 |

The tint change (dE*) was noted after 40 cycles and 160 cycles exposure.

The ageing properties of the finish were substantially improved with product 14.

A further QUVA type ageing test was carried out.

The finishes were applied to beech boards using a spray gun, in two layers (sanding was carried out between the two applications) to produce a GSM of 2×40 g/m$^2$.

Table 22 below summarizes the ageing results obtained in the second test.

TABLE 22

| Formulation | dE* after 5 exposure cycles | dE* after 160 exposure cycles |
|---|---|---|
| 13, comparative | 12 | 18 |
| 14, invention | 6 | 9 |

The tint change (dE*) was noted at two exposure times: 5 cycles and 20 cycles.

The times are expressed in 8 hour cycles.

The ageing properties of the paint were substantially improved with product 14.

Table 23 below summarizes the mechanical properties results for tests carried out on films of varnish applied in amounts of 2×40 g/m$^2$ by spraying onto beech boards.

TABLE 23

| Formulation | PERSOZ hardness (seconds) | Scratch resistance (grams) |
|---|---|---|
| 13, comparative | 106 | 150 |
| 14, invention | 120 | 300 |

The mechanical properties of the finish were substantially improved with product 14.

EXAMPLE 6

This example concerns use in a decorative interior satin-finish paint—of the glycerophthalic type with commercial reference ANTEOR SATIN from LA SEIGNEURIE.

The sol of the invention was incorporated by simply mixing in an amount of 1.5% of active material (cerium oxide) with respect to the total formulation. The formulations formed were applied to different supports and underwent conditioning in air under a controlled atmosphere (21° C.±2° C., 55%±5% relative humidity) for one week prior to evaluation.

TABLE 24

| Formulation | Description |
|---|---|
| 15, comparative | glycerophthalic paint, no UV absorber |
| 16, invention | paint with 1.5% cerium sol (cerium oxide) |

The results of the water resistance measurements are given in Table 25 below.

TABLE 25

| Formulation | Contact angle (°) |
|---|---|
| 15, comparative | 74 |
| 16, invention | 100 |

Note the improvement in water resistance properties, or even a pearling effect for the paint of the invention which rendered it hydrophobic per se.

Table 26 below summarizes the mechanical properties results.

TABLE 26

| Formulation | PERSOZ hardness (seconds) | Scratch resistance (grams) |
|---|---|---|
| 15, comparative | 53 | 180 |
| 16, invention | 62 | 250 |

The mechanical properties of the finish were improved in product 16.

EXAMPLE 7

This example concerns use in a decorative semi-matt microporous lacquer paint for wood of the glycerophthalic type with commercial reference RESPIR'BOIS from BLAN-COLOR.

The sol of the invention was incorporated by simply mixing to an amount of 1.5% of active material (cerium oxide) with respect to the total formulation. The formulations formed were applied to different supports and underwent conditioning in air under a controlled atmosphere (21° C.±2° C., 55%±5% relative humidity) for one week prior to evaluation.

TABLE 27

| Formulation | Description |
|---|---|
| 17, comparative | glycerophthalic paint, no UV absorber |
| 18, invention | paint with 1.5% cerium sol (cerium oxide) |

The results of the water resistance measurements are given in Table 25 below.

TABLE 28

| Formulation | Contact angle (°) |
|---|---|
| 17, comparative | 90 |
| 18, invention | 100 |

Note the improvement in water resistance properties, or even a pearling effect for the paint of the invention which rendered it hydrophobic per se.

Table 26 below summarizes the mechanical properties results.

TABLE 26

| Formulation | PERSOZ hardness (seconds) | Scratch resistance (grams) |
|---|---|---|
| 17, comparative | 40 | 225 |
| 86, invention | 45 | 300 |

The mechanical properties of the finish were improved in product 18.

The invention claimed is:

1. A process for improving the durability of a paint composition comprising an organic solvent phase, and based on a resin selected from the group consisting of alkyd resins, vinyl resins; aminoplast or phenolic resins, polyester resins, polyurethane resins, epoxy resins, silicone resins, cellulose resins and nitrocellulose resins, the process comprising the step of adding to said composition an amount of an organic cerium sol to produce a cerium oxide content in the paint composition of at most 3% by weight, the cerium sol comprising particles of a cerium oxide in the form of agglomerates of crystallites whose $d_{80}$ is at most 10 nm, wherein at least 80% by weight of the agglomerates comprises 3 or 4 crystallites, an amphiphilic acid system, and an organic phase, the amphiphilic acid system comprising at least one acid containing 11 to 50 carbon atoms, having at least one alpha, beta, gamma or delta branch on the atom carrying the acid hydrogen.

2. The process according to claim 1, wherein the cerium sol comprises particles with a size of at most 200 nm.

3. The process according to claim 1, wherein the particles have a $d_{50}$ of 1 to 5 nm.

4. The process according to claim 1, wherein the acid of the amphiphilic system and the cerium oxide, which is ceric oxide, are present in a mole ratio of 1/5 to 4/5.

5. The process according to claim 1, wherein the amphiphilic acid system contains isostearic acid.

6. The process according to claim 1, wherein the paint composition is UV curable.

7. The process of claim 1, further comprising drying the organic cerium sol to form a powder or a gel prior to adding the organic cerium sol to the composition.

8. A process for improving the durability of a paint composition comprising an organic solvent phase, and based on a resin selected from the group consisting of alkyd resins, vinyl resins, aminoplast or phenolic resins, polyester resins, polyurethane resins; epoxy resins; silicone resins; cellulose resins or nitrocellulose resins, the process comprising the step of adding to said composition an amount of an organic cerium sol to produce a cerium oxide content in the paint composition of at most 3% by weight, the cerium sol comprising particles of a cerium oxide in the form of agglomerates of crystallites whose $d_{90}$ is at most 8 nm, wherein at least 80% by weight of the agglomerates comprises 3 or 4 crystallites, an amphiphilic acid system, and an organic phase, the amphiphilic acid system comprising at least one acid containing 11 to 50 carbon atoms, having at least one alpha, beta, gamma or delta branch on the atom carrying the acid hydrogen, wherein the amphiphilic acid system contains isostearic acid, the particles of cerium sol have a size of at most 100 nm, and the water content of the sol is at most 1%.

9. The process of claim 8, wherein the organic phase is selected from the group consisting of aliphatic hydrocarbons, inert cycloaliphatic hydrocarbons, aromatic hydrocarbons, chlorinated hydrocarbons, and combinations thereof.

10. The process of claim 8, wherein the organic phase comprises a solvent containing C11 and C12 iso- and cylco-paraffinic hydrocarbons.

* * * * *